(12) United States Patent
Pelletier

(10) Patent No.: US 7,254,493 B1
(45) Date of Patent: Aug. 7, 2007

(54) PRESSURE TRANSDUCER BASED FLUID VELOCITY SENSOR

(75) Inventor: Mathew G. Pelletier, Idalou, TX (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 11/304,314

(22) Filed: Dec. 15, 2005

Related U.S. Application Data

(60) Provisional application No. 60/640,342, filed on Dec. 30, 2004.

(51) Int. Cl.
*G01F 1/00* (2006.01)

(52) U.S. Cl. ..................... 702/47; 340/856.4

(58) Field of Classification Search ............. 702/45, 702/47, 50, 57, 75, 79, 89, 92, 98, 100, 138, 702/189; 73/861.42, 861.47; 340/451, 670, 340/853.1, 856.4; 367/83, 18
See application file for complete search history.

(56) References Cited

U.S. PATENT DOCUMENTS

| | | | | |
|---|---|---|---|---|
| 4,215,425 | A | * | 7/1980 | Waggener .................... 367/83 |
| 4,361,050 | A | * | 11/1982 | Coussot et al. .......... 73/861.47 |
| 5,388,583 | A | * | 2/1995 | Ragauskas et al. ......... 600/451 |
| 2002/0129662 | A1 | * | 9/2002 | Gysling et al. .......... 73/861.42 |
| 2002/0180613 | A1 | * | 12/2002 | Shi et al. ................. 340/853.1 |

\* cited by examiner

*Primary Examiner*—Bryan Bui
*Assistant Examiner*—Mohamed Charioui
(74) *Attorney, Agent, or Firm*—John D. Fado; Randall E. Deck; Lesley Shaw

(57) ABSTRACT

The invention consists of a pressure transducer based air velocity sensor that has been optimized for use in metal ducts. The fluid flow velocity is determined by measuring the propagation delay of a direct path pressure wave signal transmitted through the fluid as a function of a frequency difference rather than as a phase delay measurement. This system electronically removes multi-path signals from the measured signal, thereby obviating the requirement for installation calibration.

18 Claims, 14 Drawing Sheets

Time (s)

Magnitude (dB)

Magnitude (dB)

PRESSURE TRANSDUCER BASED FLUID VELOCITY SENSOR

This application hereby claims the benefit of U.S. provisional patent application 60/640,342, filed Dec. 30, 2004, the content of which are incorporated by reference herein.

BACKGROUND OF THE INVENTION

1. Field of the Invention

The invention relates to an improved system for measuring the velocity of fluid streams utilizing a pressure transducer.

2. Description of the Prior Art

About 100 million bales of cotton are produced annually in the world of which 18-20 million are produced in the United States. After the harvesting operation, the seedcotton is taken to a cotton gin where one of the key processing steps is performed, the separation of the lint from the seeds and other contaminants. The predominant method of conveyance of the product through the cotton gin processing system is by pneumatic conveyance. Optimal operation of many of processing systems in the cotton gin can be improved through the monitoring of the air velocity.

Air velocity sensing in process control systems is predominantly performed by hot wire anemometry, however in some applications where the fluid lines are subjected to high levels of particulate contamination, the hot wire anemometer's calibration can be affected due to the build up of the contaminants on the hot wire sensor. A common alternative to the hot wire anemometer is to utilize a pressure sensor to determine the air velocity by measuring the time of flight of a pressure wave and thereby determine the velocity of the pressure wave. The velocity of the pressure wave provides a measure of both the speed of sound, a function of air temperature and density, as well as the velocity of the gas. In practice, the measurement is typically measured in both the upstream and downstream directions which allows for the quantification of the air velocity as well as the sonic velocity and thereby the molecular density of the fluid. As this also allows for the removal of the effects of the density from the measurement, this leads directly to a measure of the fluid velocity. This type of measurement is commonly referred to as a sonic flow meter.

A primary advantage of the sonic flow meter is that it doesn't require an invasion of the measurement space. As such, installation of a sonic flow system does not require a shutdown of the system being monitored nor does it require cutting into the fluid lines. Additionally, since the sonic flow meter does not require physical contact between the measuring apparatus and the liquid whose rate is being measured, there is no possibility that the sonic apparatus will alter the flow being measured or will be adversely affected by the chemical nature of the fluid being monitored. A number of different approaches have been taught in the art for sensing and measuring the motion of fluids utilizing principles of sonic velocity measurement.

One of the simplest techniques for measuring the fluid velocity utilizes a Doppler shift technique. In practice, the Doppler technique transmits a continuous stable frequency sinusoidal wave to an acoustic transducer that produces an acoustic pressure wave that is directed toward oncoming or outgoing particles that reflect the pressure wave back to the transducer. As the particles are moving relative to the stationary transducer, a Doppler frequency shift is imparted to this pressure wave. Upon reception of the returned wave, the frequency of the transmitted wave is compared to the received wave with the frequency difference providing a direct measure of the relative velocity between transducer and the particles. The disadvantage to the Doppler technique is that it only works in fluids with a significant amount of particulate contamination. Use of this system is also subject to errors when measuring streams having a mix of particulates of varying sizes. In such streams, the particulates of different sizes will impart different velocities onto the returned pulse due to the particulates traveling at different velocities due to the varying drag force, which is proportional to the wetted area of the particle. Thus, the mean particle size has a direct influence on the obtained measurement which affects the application's accuracy, as it is directly related to the uniformity and predictability of the suspended particles in the fluid stream. For use in cotton gins, this is an undesirable characteristic due to its inherent variability and unpredictability.

One of the most commonly practiced techniques for measuring fluid velocity utilizing pressure transducers is the direct time of flight measurement of either a single pulse or a burst of a successive set of pulses, U.S. Pat. Nos. 5,060,506, 6,568,281, 4,515,021, 4,308,754, and 3,575,050 are primary examples disclosed in their entirety by reference herein. The primary disadvantage to this technique is that for the close distances that are typical in these transducers, the requirements to directly and accurately measure the time of flight of a pulse transmission, as varied by the fluid velocity, leads to the requirements of extraordinarily fast clocks in order to resolve the time of flight to a sufficient level of resolution. For instance, in the measurement of air velocity across a typical range utilized by cotton gins (9.144 m/s (30 ft/s) to 12.192 m/s (40 ft/s)); the delta time difference between the low speed versus the high speed leads to a time difference of 22.2 µs. Given we'd like some dynamic range with the measurement, in order to obtain a 10 bit accurate measurement the measurement needs to be resolved with a 5.4 ns clock. This situation becomes even more exacerbated when the fluid is a liquid as the sonic velocity is over 4 times this speed. Thus, the time base for a typical liquid application at 10 bit resolution would have to be increased to over 2.8 GHz. Thus, this technique doesn't lend itself to an accurate, low cost solution.

Other problems associated with the direct time of flight measurement lay in the difficulty in the detection of the arrival time of an ultrasonic pulse passing through a fluid as it is affected by turbulent flow conditions in high Reynolds number flows as well as turbulence cause by entrained particles as well as changes in fluid temperature, pressure, and composition which leads to a received pulse of varying amplitude as well as shape. Thus, an ultrasonic pressure wave propagating through a fluid can be subjected to a wide variety of different and rapidly varying amounts of attenuation. In order to overcome this difficulty, many patents have focused on the development of automatic gain amplifiers to compensate. While this works, it further complicates an already difficult measurement.

Another commonly practiced technique transmits a continuous wave (CW) single frequency signal to the receiving transducer. Upon reception at the receiving transducer, the received signal is compared to an internal reference that is used to drive the transmitting transducer. As the internal signal is transmitted electrically, there is very little delay compared to the signal that is transmitted through the fluid via the pressure transducers. By measuring the phase difference between the internal reference signal and the pressure transmitted signal, it is possible to accurately determine the fluid velocity. By utilizing a measurement of the phase difference between the transmitted signal and the receiving signal, a much more accurate measurement than that provided by the time of flight technique, is obtained. One of the original patents utilizing this technique was U.S. Pat. No. 3,861,211 by Dewan.

Unfortunately, one of the fundamental limitations of the phase determination method is due to the inability of a phase difference measurement to resolve phase differences greater than 360 degrees since a sine wave repeats itself every 360 degrees. This leads to a problem referred to as "phase ambiguity". Thus, this technique imposes limitations upon the span of the velocity as the total time delay measurement becomes a function of the transmitted frequency. When this is coupled with the fact that currently there are few low cost transducers available and they are frequency dependant with only a few frequency choices currently available, these issues to render this technique unusable in many applications.

Another primary problem with the phase difference measurement technique lays in it's inability to remove the effects of standing waves in a closed cavity. Thus, in practice, this technique is best utilized in open air structures where standing waves can be minimized. This need to avoid standing waves lays in the need to avoid receiving more than one signal that has taken different paths from the transmitter to the receiver as this leads to alterations in the direct path signal by the multi path signals. As the multipath signals are the same frequency as the direct path signal, the reception of the multipath signals in conjunction with the direct path signal alters both the amplitude as well as the phase of the original signal. Thus, despite the advances in the measurement of fluid velocity, there remains a critical need for production of a low cost sensor which can remove the effect of the multipath signals from the received direct path signal, while maintaining the accuracy of the direct time of flight methodology.

SUMMARY OF THE INVENTION

I have now invented a novel pressure transducer based process and device for determining the velocity and density or molecular weight of a fluid stream. The invention also provides a measurement that is free from interference by multipath standing waves. By virtue of this invention, these multipath signals may be electronically removed from the measured signal. Moreover, in contrast with prior phase determination methods, this process is not subject to phase ambiguity. As will be described in greater detail hereinbelow, in accordance with this invention, the fluid flow velocity is determined by measuring the propagation delay of a direct path pressure wave signal transmitted through the fluid as a function of a frequency difference rather than as a phase delay measurement. By measuring the propagation delays of two pressure waves traveling in opposite directions through the fluid, the fluid velocity may be determined independently of the temperature or sonic velocity (the speed of sound) in that fluid. The process of the invention includes the steps of:

producing a primary electrical signal with a varying frequency, this signal may be a continuously varying signal or a discrete time varying signal, splitting the primary signal to provide first and second electrical signals, wherein the first electrical signal is used to generate a first pressure wave signal which is transmitted through the fluid, and the second signal provides an internal reference signal, transmitting the first pressure wave signal through the fluid stream, receiving a third signal at a receiver, wherein the third signal includes the first pressure wave signal after it has passed through the fluid, possibly in combination with multi-path interference signals from the surrounding area that may or may not have passed through the fluid, mixing the third signal together with the second signal, generating a mixed signal, filtering the mixed signal to remove substantially all of the multi-path interference signals as well as the upper sideband created in the mixing step, thereby generating a filtered-mixed signal, and measuring the frequency of the filtered-mixed signal, wherein the frequency of the primary signal varies sufficiently rapidly that the frequency of the third signal and the second signal will be different when they arrive at the mixer.

For fluid velocity measurements, the first pressure wave signal should be transmitted through the fluid in a first direction which is diagonal to or parallel with the direction of fluid flow. In contrast, for measurement of fluid density or sonic velocity, the first pressure wave signal may be transmitted either normal to or diagonal to the direction of fluid flow.

If the sonic velocity through the fluid is known or otherwise determined, the velocity of the fluid may be calculated from the measured frequency of this filtered mixed signal. However, the velocity of the fluid may also be readily determined independently of the sonic velocity in the fluid by measuring the propagation delays of two pressure waves traveling in opposite directions through the fluid.

In this embodiment, the same steps described above are repeated, except that another first pressure wave signal is also transmitted through the fluid in a second direction which is opposite from the first direction. Because the velocity of the pressure wave transmitted through the fluid in a downstream direction will have its velocity increased by the moving fluid, while the pressure wave transmitted through the fluid in an upstream direction will have its velocity decreased by an equal amount, the velocity of the fluid may be calculated independently of the sonic velocity.

The invention also relates to an apparatus for automatically determining the velocity and density or molecular weight of a test fluid. The apparatus includes a pressure wave signal generator effective for producing a pressure wave signal with a continuously varying frequency, pressure wave signal transmitter and receiver (transducers) effective to transmit and receive a pressure wave signal through the material, a signal mixer, an analog or an analog plus digital pressure wave signal filter, and a frequency detector. The apparatus also includes a microprocessor effective for calculating the fluid velocity from the frequency of the filtered-mixed signal.

In accordance with this discovery, it is an object of this invention to provide an improved pressure wave process and apparatus for measuring the velocity and density or molecular weight of fluids such as liquids and gases.

It is also an object of this invention to provide a process and apparatus for measuring fluid velocity free from interference by multipath interference signals.

It is another object of this invention to provide a fluid velocity measuring device having an improved sensitivity.

It is a further object of this invention to provide a method and apparatus for determining the speed of sound and hence the density of a fluid, thereby providing a means for determination of the concentration of the components of binary mixtures of gases.

Other objects and advantages of the invention will become readily apparent from the ensuing description.

DETAILED DESCRIPTION OF THE INVENTION

Figure 1:
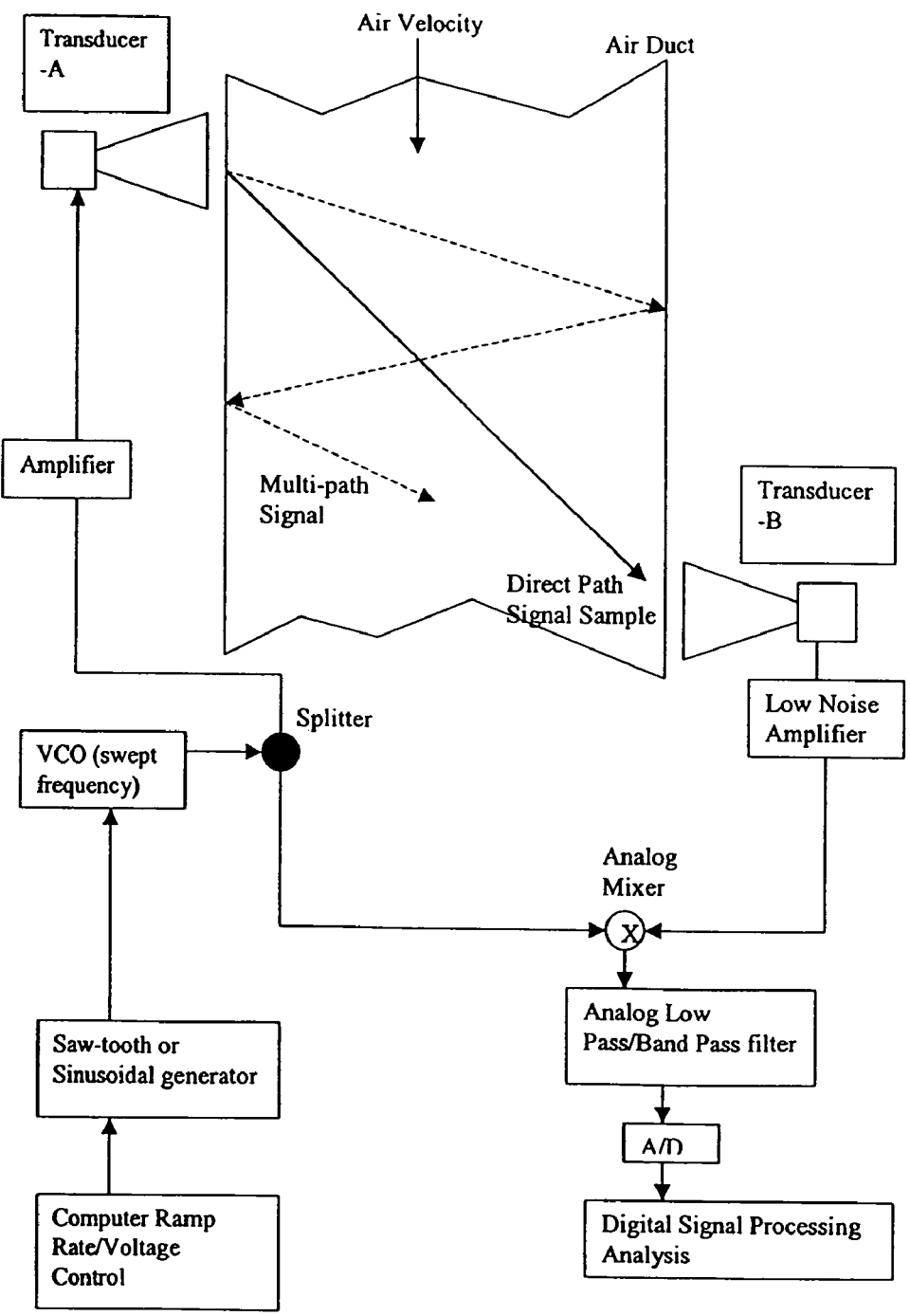
FIG. 1 is a schematic layout of the pressure wave fluid velocity sensor of the invention with multi-path interference waves present.

A pressure wave is defined herein as ranging from and including sonic waves to ultrasonic waves having a frequency between about 20 KHz to about 20 MHz.

In the transmission of pressure wave energy, a large portion of the signal being transmitted goes out the side of the transmitting transducer in a direction not directly towards the target of the receiving transducer. Thus, a significant amount of energy is transmitted into the off axis directions. This off axis energy provides the energy for the multi-path interference. When this stray energy is released inside a metal conduit, it is free to be redirected back to the receiving transducer. Thus, the stray radiation bounces around until it is either absorbed by an object or is absorbed at the receiving transducer as multi-path interference. This fact gives rise to a large number of multi-path interfering signals. This combination of the multi-path signals with the direct path signal results in the reception of a series of sinusoids of the same frequency but with an altered phase and magnitude at the receiving transducer.

A typical model used for multi-path interference utilizes the addition of two or three delayed versions of the direct path signal to form a composite received signal at a reduced magnitude that is typically very much less than 1 (Stremler, ibid). The reduction in magnitude is allowed as it is representative of the real-world phenomenon. In mathematical terms, this signal combination is illustrated in equation 1:

$$S(t)=s(t)+a_0 \cdot s(t+t_1)+a_1 \cdot s(t+t_2)+a_2 \cdot s(t+t_3) \qquad (1)$$

where $S(t)$:=the received signal as a function of time (t).

$s(t)$:=the transmitted signal as a function of time (t).

$s(t+t_i)$:=the time delayed version of the transmitted signal or multi-path signal.

$a_{0-3}$:=reduction coefficients where a<<1.

If a pressure wave fluid velocity sensing system used a continuous wave signal to transmit pressure waves through a fluid, multipath interference signals would generate a set of like frequency sinusoids of various amplitudes and phases the sum of which would produce a single sinusoid at the same frequency with an altered amplitude and phase. This would unpredictably alter the direct path signal's amplitude and phase that are the basis for the pressure wave time of flight measurement.

To overcome this problem, this invention utilizes a frequency modulated signal that can be examined after heterodyning the signal down to a lower and more manageable frequency.

The heterodyning signal mixing equation, where two signals are combined together in a mixer to form a new signal that is at both a sum and difference frequency (Stremler, ibid), is illustrated. Mathematically this is equivalent to a multiplication of the two signals together as shown in equation (2):

$$Y(t)=2\sin(\omega_1 t)\sin(\omega_2 t)$$

$$=\cos(\omega_1 t-\omega_2 t)-\cos(\omega_1 t+\omega_2 t)$$

$$=\cos(\{\omega_1-\omega_2\}t)-\cos(\{\omega_1+\omega_2\}t) \qquad (2)$$

Expanding equation 2 to include the phase terms leads to equation 3 and 4:

$$Z(t)=2\sin(\omega_1 t+\phi_1)\sin(\omega_2 t+\phi_2)$$

$$=\cos(\omega_1 t+\phi_1-\omega_2 t-\phi_2)-\cos(\omega_1 t+\phi_1+\omega_2 t+\phi_2) \qquad (3)$$

and letting $\phi_3=\phi_1-\phi_2$ and $\phi_4=\phi_1+\phi_2$ then $$Z(t)=\cos(\{\omega_1-\omega_2\}t+\phi_3)-\cos(\{\omega_1+\omega_2\}t+\phi_4) \qquad (4)$$

In the use of a pressure wave time of flight measurement system, it is critical that the phase and the magnitude of the signal are preserved. To examine the potential for use of a mixer in the system, let the first signal be the reference signal and in doing so let it's phase be equal to zero and the amplitude equal to unity. Signal two will be the received direct path signal with an altered phase and magnitude. Given this assumption, the applied form of equation 4 is shown in equation 5:

$$Z(t) = \sin(\omega_1 t) A \cdot \sin(\omega_2 t + \phi_2)$$
$$= 0.5 \cdot A [\cos(\{\omega_1 - \omega_2\} t - \phi_2) - \cos(\{\omega_1 + \omega_2\} t + \phi_2)] \quad (5)$$

The final operation is to pass the signal through a low pass filter operation in order to remove the upper side-band portion of the signal (equation 6):

$$Z(t) * Lp(t) = 0.5 \cdot A \cos(\{\omega_1 - \omega_2\} t - \phi_2) \quad (6)$$

Where $Z(t)*Lp(t):=$convolution of signal $Z(t)$ with the low pass linear filter $Lp(t)$.

Note that both the amplitude as well as the phase information contained in the fluid altered signal number two are preserved in both the upper-side band ($\omega_1+\omega_2$) as well as the lower side band ($\omega_1-\omega_2$) of the carrier modulated signal. Thus, the signal can be translated from one frequency to another without loss of amplitude and phase information as long as the signal is mixed against a known reference frequency. For ease of processing, the system then removes one of these side bands through either analog or digital filtering. For ease of processing, the upper side-band is the one that is typically removed.

The mathematics provided in the previous paragraph provides the basis for this invention with the primary goal to shut out any signal that is delayed beyond the expected direct path delay. To achieve this goal, the invention varies the reference transmit frequency so that it is continuously varying or discretely varying, such that the frequency varies sufficiently rapidly that the frequencies of the signal transmitted through the material and the reference signal will be different when they are received at the receiver. This reference frequency is then combined with the received signal in a mixer to produce the sum and difference frequencies. The sum frequency is removed through filtering and the remaining difference frequency is due to the propagation delay of the direct path signal times the rate of the frequency variation. Thus, by providing a known rate of frequency variation, this difference frequency provides a direct measure of the propagation delay (otherwise known as the phase velocity, phase delay or propagation time) due to the transmission through a moving fluid.

This technique results in the direct path having a small difference or delta frequency and a much larger delta frequency for the multi-path signals as they will take longer to arrive at the receiver than the direct path signal. This frequency difference between the direct path signal and the multi-path signals allows for direct removal of the multi-path components by means of a band-pass filter centered around the expected delays of the direct path signal.

Other advantages are in the invention's ability to measure the propagation delay of the direct path signal as a function of the received frequency difference rather than as a phase delay measurement such as described in the prior art. This transformation of the propagation delay from a phase measurement to a frequency difference measurement removes the integer rollover experienced with a phase measurement. Thus, in the propagation delay measurement method utilizing a direct phase difference measurement method, the phase difference is limited to +/−180 degrees before the measurement repeats itself. This leads to a phase ambiguity in the processed signal. Conversely the frequency difference measurement of this invention does not suffer from this phase ambiguity issue and as such can provide a much larger measurement of propagation delay than the direct phase-delay method. This is highly advantageous in some measurement configurations where the large range of fluid densities and velocities that will cause a phase delay range that exceeds 360 degrees, will lead to an ambiguous phase delay measurement due to the roll over of the phase measurement.

The specifications and tolerance of this type of system can be inferred from single frequency continuous wave (CW) measurements. In the CW system, it is noted that the phase as measured for a given test specimen is also a function of the frequency. Thus, a very accurate, stable and repeatable method must be utilized to vary the reference frequency and therefore ensure that frequency drift of the oscillators will not compromise the measurements.

One preferred technique for varying the frequency is to provide a modulating frequency that is phase locked to a very stable oven-temperature controlled crystal oscillator. In this manner the carrier frequency can be modulated in a very precise and stable manner with variation of the carrier frequency determined by the frequency range of the modulating voltage controlled oscillator (VCO).

FIG. 1 shows an apparatus of a first embodiment for measuring fluid velocity in free space as well as in conduits such as pipes. The apparatus includes a generator for producing a time varying control signal that is used as an input to a VCO with the primary purpose of all of these techniques is providing a frequency output from the VCO that is time-varying, repeatable and stable. In this invention, this time varying signal can be of any repeatable form with examples such as a sinusoid or sawtooth or ramp wave form being suitable forms that can readily be adapted to this technique with the preferred waveform for this invention being the sawtooth. In FIG. 1, the voltage controlled oscillator is used for this purpose. This oscillator will provide a stable frequency base for the modulating signal. A variety of other alternative methods of providing this time varying control signal may be used. In one such alternative embodiment, it is generated by utilizing digital synthesis of the sinusoidal or ramp waveform in conjunction with an analog low pass filter to provide a good analog representation of this digital time-varying signal. Standard methods may also be used to provide an analog sinusoid or sawtooth ramp signal. At the output of the synthesis of the voltage control signal the optional addition of an amplifier/attenuator allows the system to adjust the peak to peak voltage range thereby providing control over the final peak to peak frequency deviation of the high frequency VCO. The modulating repetition frequency of the control voltage can also be varied from 100 Hz to 100 MHz with the preferred range of modulation frequency being between 1 kHz and 100 kHz. This control voltage modulation is used to control the VCO to output the transmitting pressure wave signal that varies over a narrow frequency range about the target frequency. One preferred example is to have this control voltage input to the VCO, control the VCO to output frequencies that range from 40 kHz to 41 kHz thereby providing a maximum frequency deviation of the transmitting signal of 1 kHz. It should be noted that this maximum frequency deviation could be larger. As detailed with the examples, the target frequency has a degree of flexibility, however for use in fluid velocity measurements, this target frequency range is typically kept between about 20 KHz and about 20 MHz.

Figure 2:
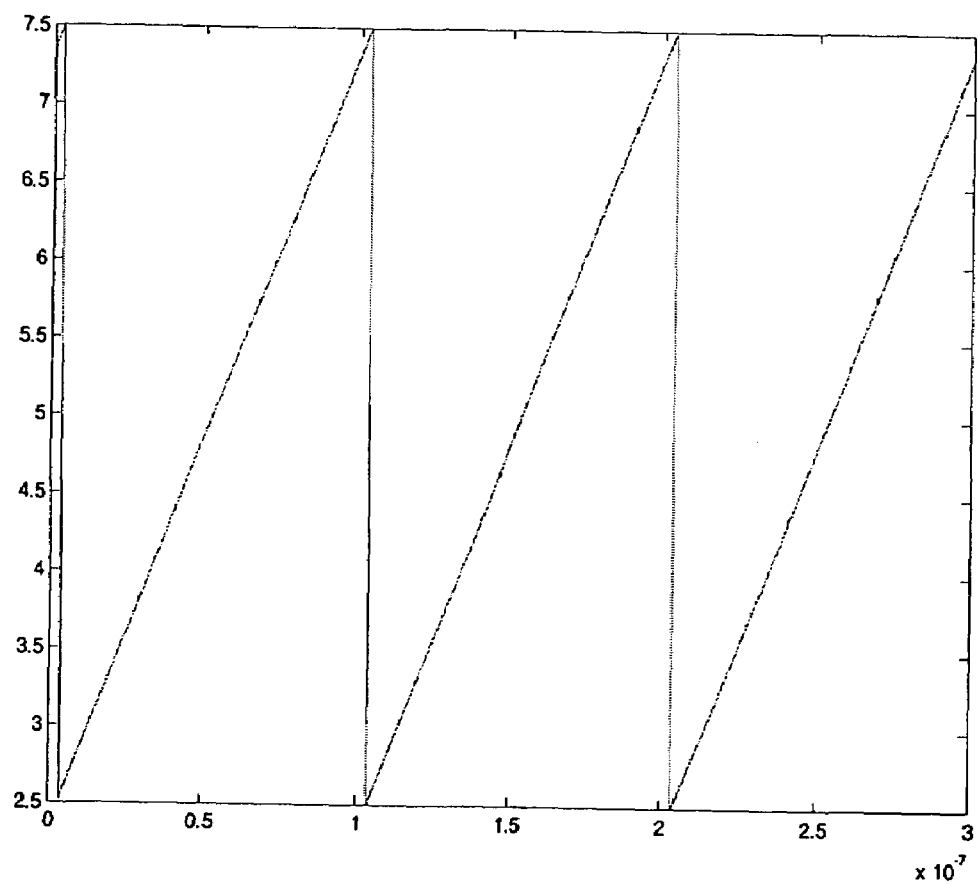
FIG. 2 is a frequency versus Time Plot of the Signal that is used to modulate the VCO in Example 1.
Figure 3:
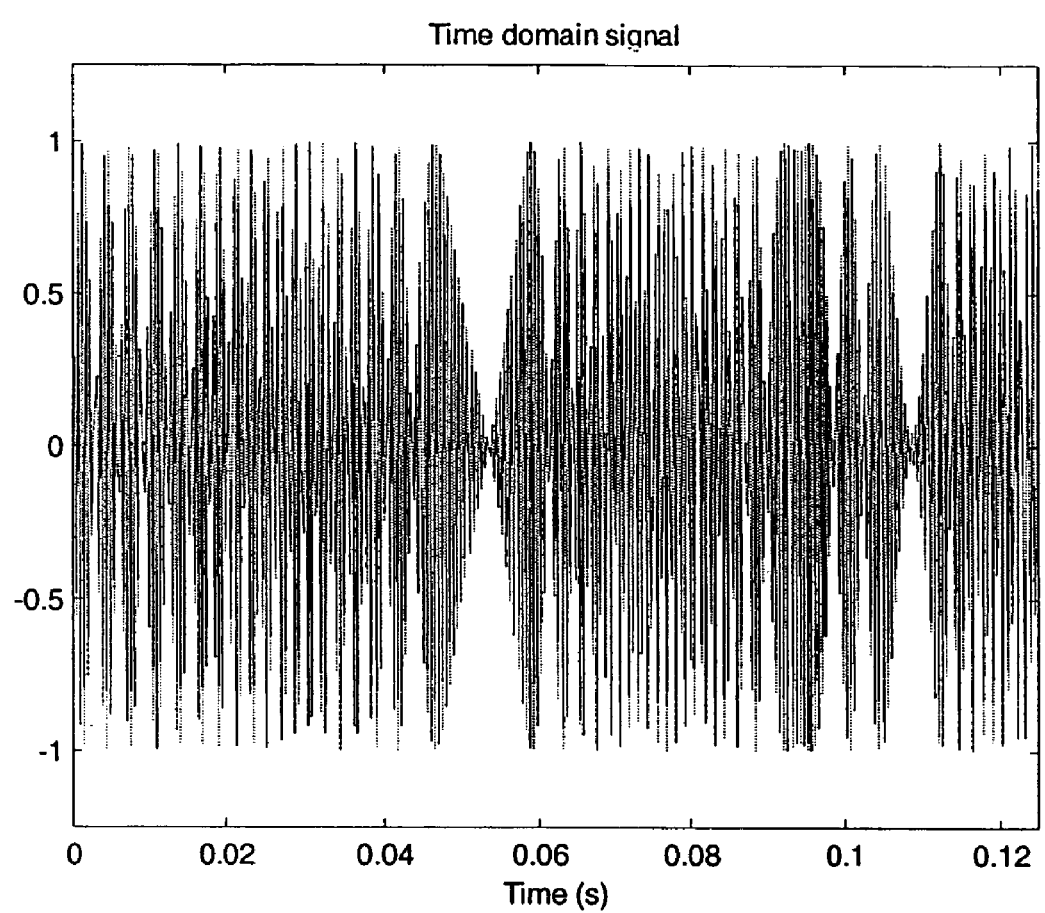
FIG. 3 is a time Domain Plot of the Transmitted Signal in Example 1.
Figure 4:
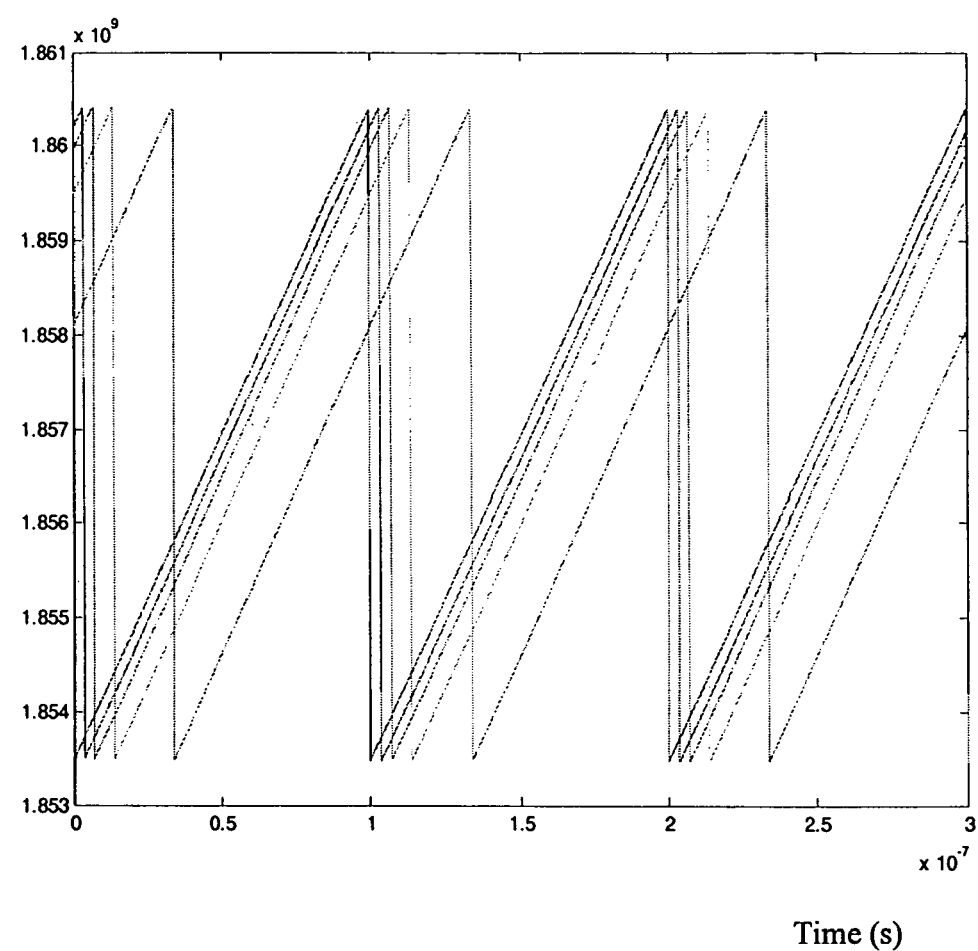
FIG. 4 is a Frequency versus Time Plot of the Received Signals. The first to arrive is the direct path signal and the others are the delayed multi-path signals in Example 1.

This embodiment provides a pressure wave swept signal that is used to transmit through the fluid. This signal is also used as the reference signal by splitting the signal, before the pressure transducer, and directing one as the reference and the other towards the transmitting pressure transducer. The details of the system are shown in FIG. 1. This figure depicts a device effective for providing a time varying control signal to provide frequency modulation of the transmitting VCO. As the preferred waveform for this invention is the sawtooth, the rest of the discussion will focus on this waveform, though it should be noted that equivalent results can be achieved with other waveforms. The frequency versus time response of this signal is detailed in FIG. 2. The signal in the time domain is shown in FIG. 3. During the transmission process, the signal spreads out into multiple directions leading to the signal taking different paths to the receiver (transducer) due to the reflection off of metal surfaces, some of which are typical in conduit or pipe applications. As each of these paths are of differing lengths, the receiving transducer receives multiple copies of the original signal, all of which arrive at different times. This is shown in FIG. 4.

Figure 5:
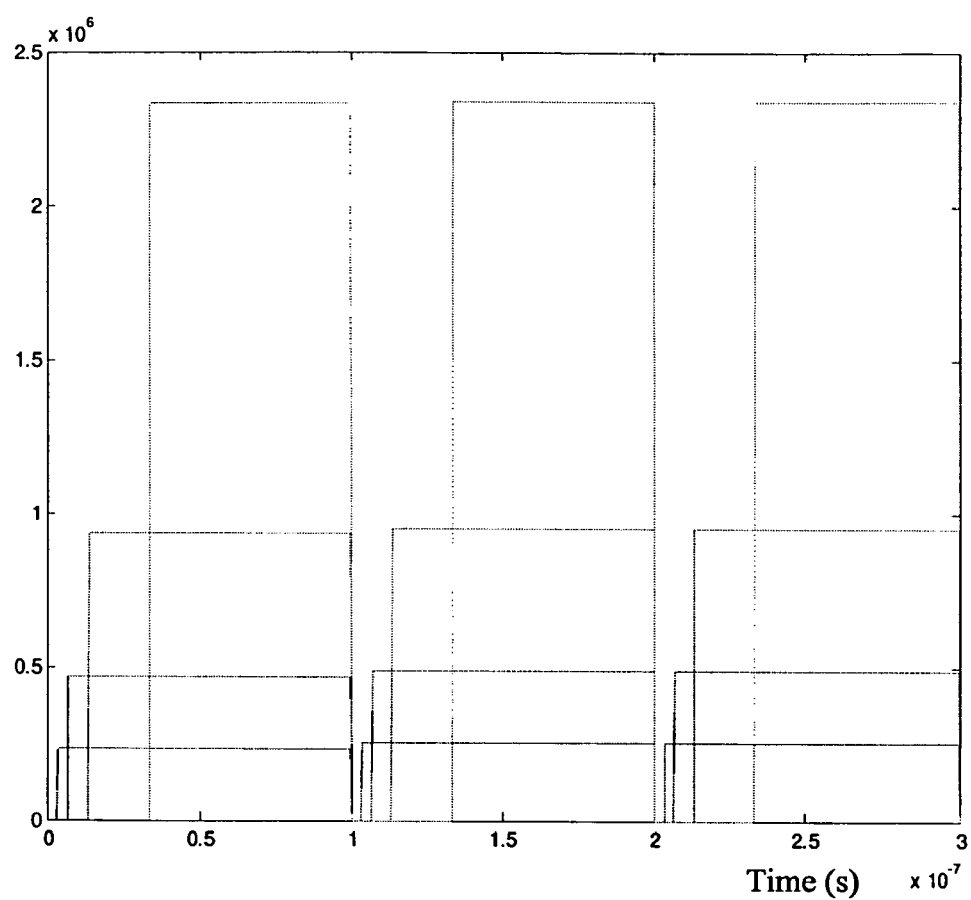
FIG. 5 is a theoretical plot of Frequency versus Time of the Received Signals after mixing to heterodyne signals to lower frequency in Example 1. The smallest frequency signal corresponds to the direct path signal and the others are the delayed multi-path signals.
Figure 6:
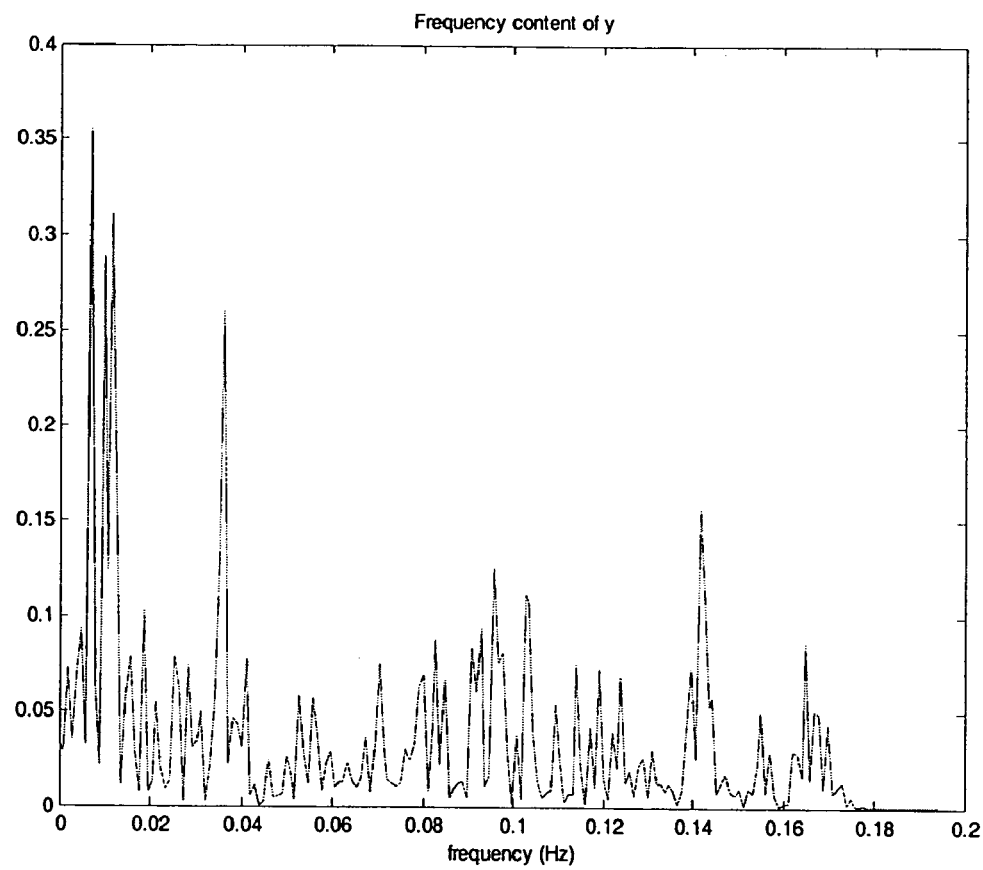
FIG. 6 is a power Spectral Density Frequency versus Time of the Received Signals after mixing (includes both the direct path plus all of the multi-path components) in Example 1.

Upon reception of the signal at the receiving transducer, the pressure wave signal is passed through a low noise amplifier and then combined with the reference signal at a signal mixer. At this point the reference signal is at a higher frequency than the received signal. This is due to the longer propagation delay the signal undergoes during transmission through the fluid than the reference which is transmitted internally over a short segment of coaxial cable. At the mixer, the sum and difference of these two frequencies are then produced due to the mixer's signal multiplication properties. Following the mixer, the sum and difference signal is passed through a low pass filter which removes the sum portion of the signal leaving only the difference signal. The theoretical difference frequency for the direct path signal as well as the further delayed multi-path signals is shown in FIG. 5. The direct path signal is the lowest frequency, in this figure, as it takes the shortest path to the receiving transducer. While the theoretical simplified equations provide insight, by transforming the time based signal into the frequency domain by means of a fast Fourier transform the true phenomena can be examined. This technique first subtracts the mean to remove the dc component and then utilizes a Hanning window to provide good spectral separation (Pozar, ibid) (Strum, R. D. and D. E. Kirk, 1988, First Principles of Discrete Systems and Digital Signal Processing, Addison-Wesley Publishing Co., Reading, Mass.) before performing the discrete Fourier Transform. The complex transform data is then multiplied by it's complex conjugate to form the power spectral density. FIG. 6 details the power spectral density of the received direct and multi-path signals in the frequency domain.

Figure 7:
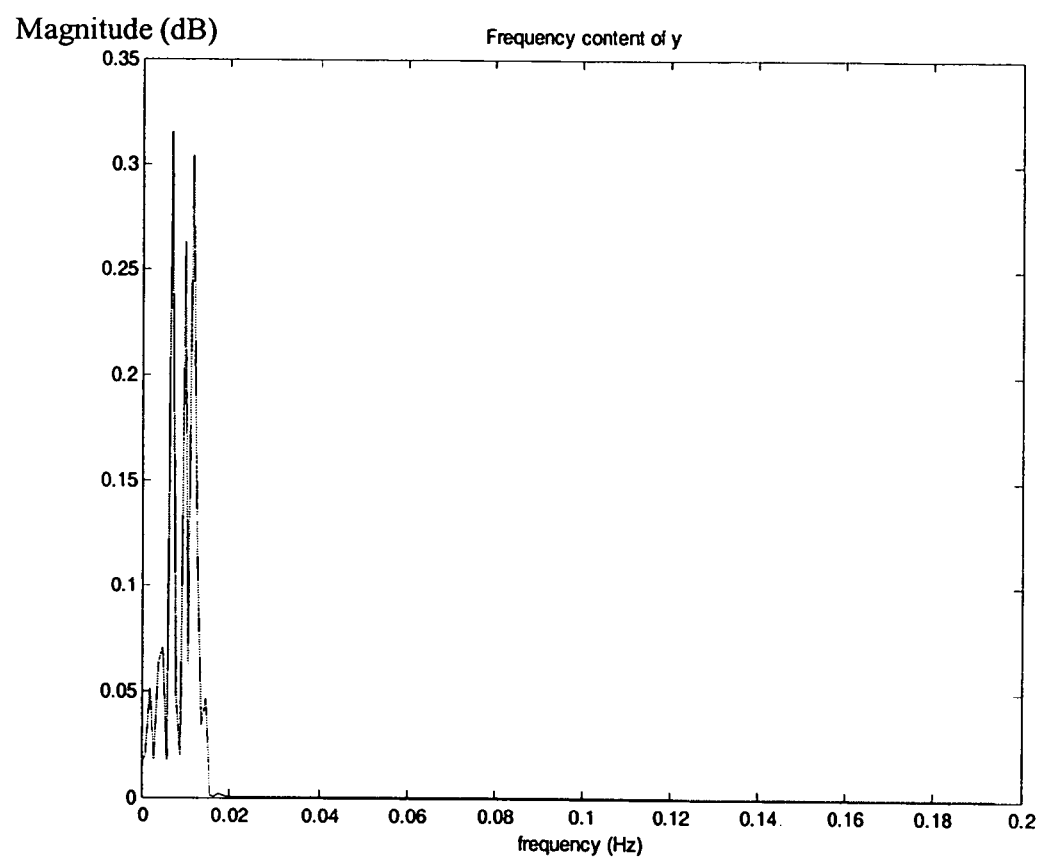
FIG. 7 is a power Spectral Density Frequency versus Time of the direct path signal in Example 1. The Fourier transform was performed after mixing the signal down to the base-band frequency.
Figure 8:
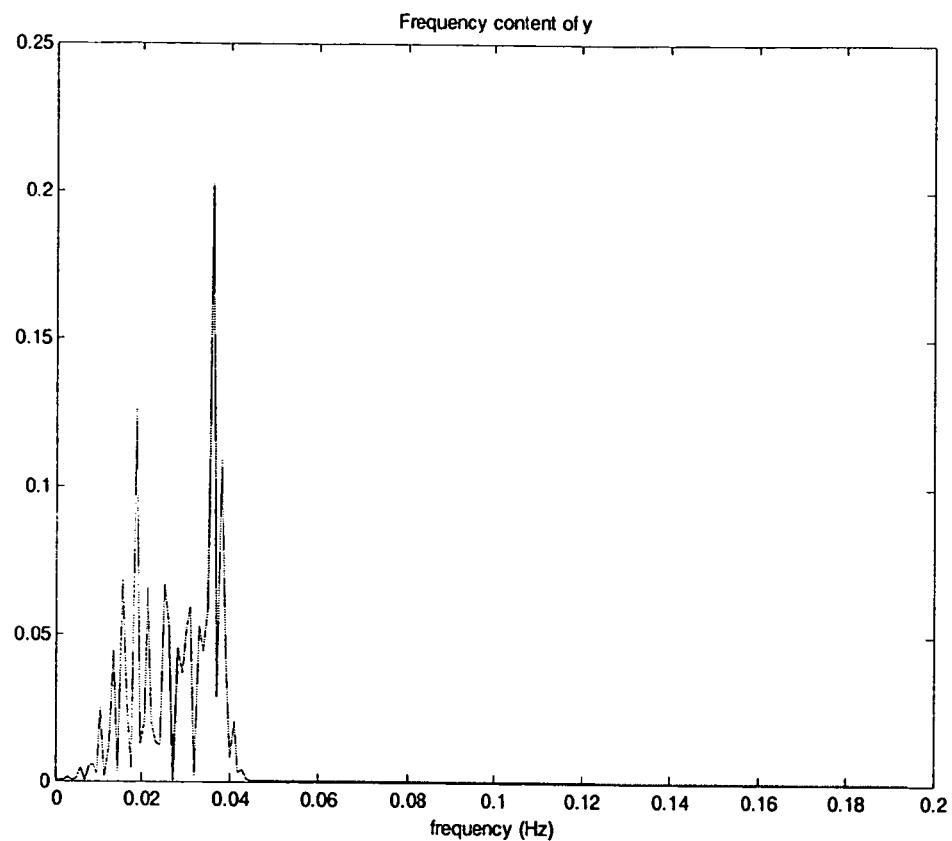
FIG. 8 is a power Spectral Density Frequency versus Time of the first multi-path signal to arrive at the receiving antenna in Example 1. The Fourier transform was performed after mixing the signal to the base-band frequency.
Figure 9:
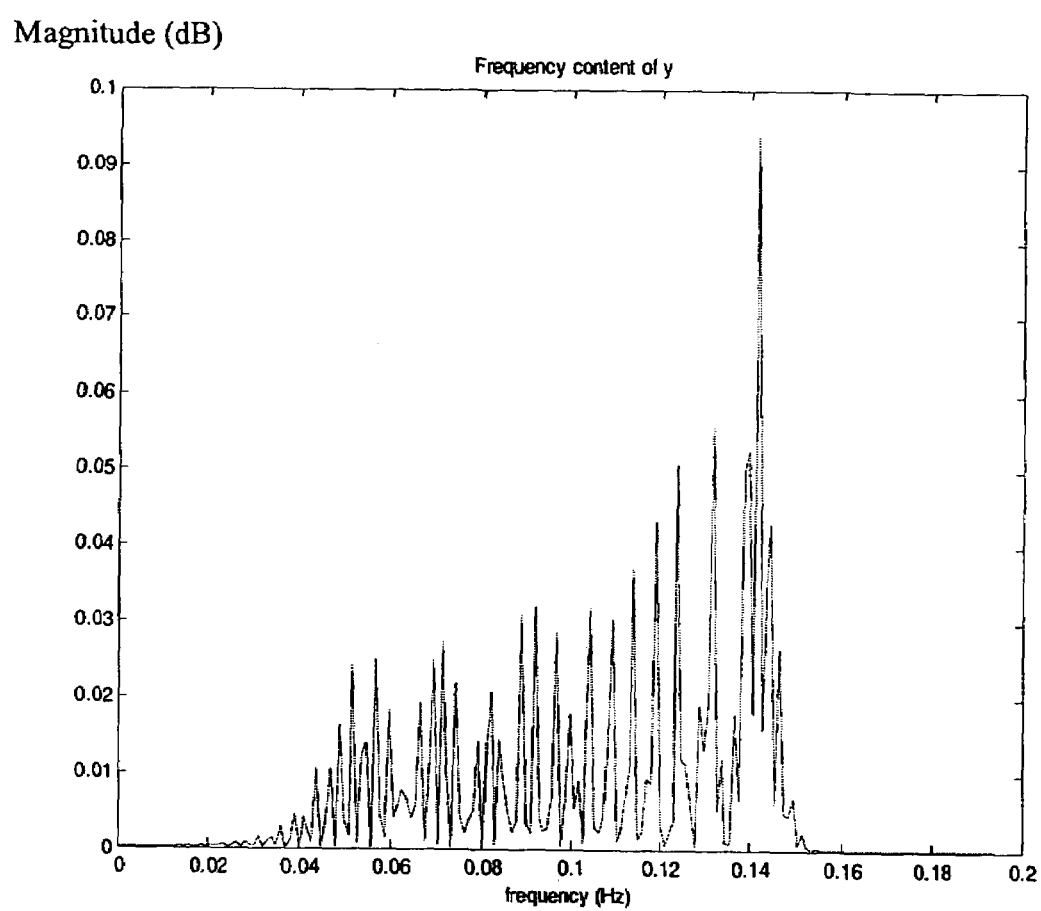
FIG. 9 is a power Spectral Density Frequency versus Time of the second multi-path signal to arrive at the receiving antenna in Example 1. The Fourier transform was performed after mixing the signal to the base-band frequency.
Figure 10:
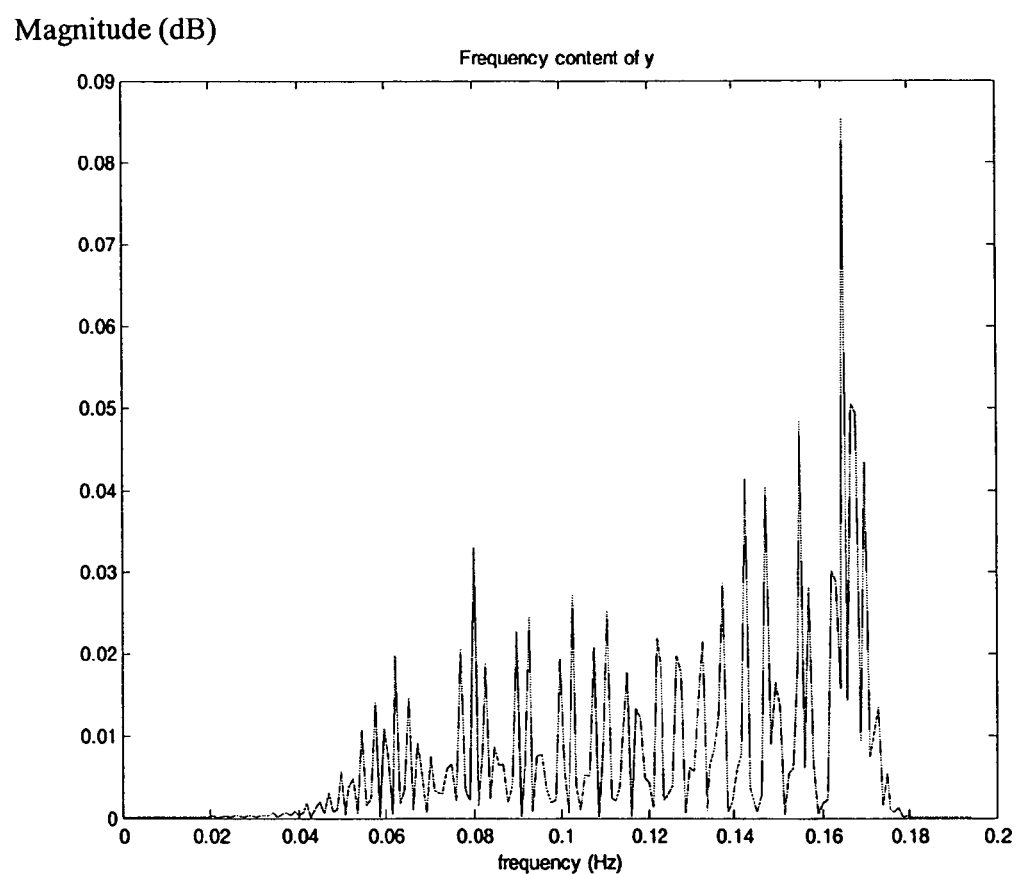
FIG. 10 is a power Spectral Density Frequency versus Time of the third multi-path signal to arrive at the receiving antenna in Example 1. The Fourier transform was performed after mixing the signal to the base-band frequency.
Figure 11:
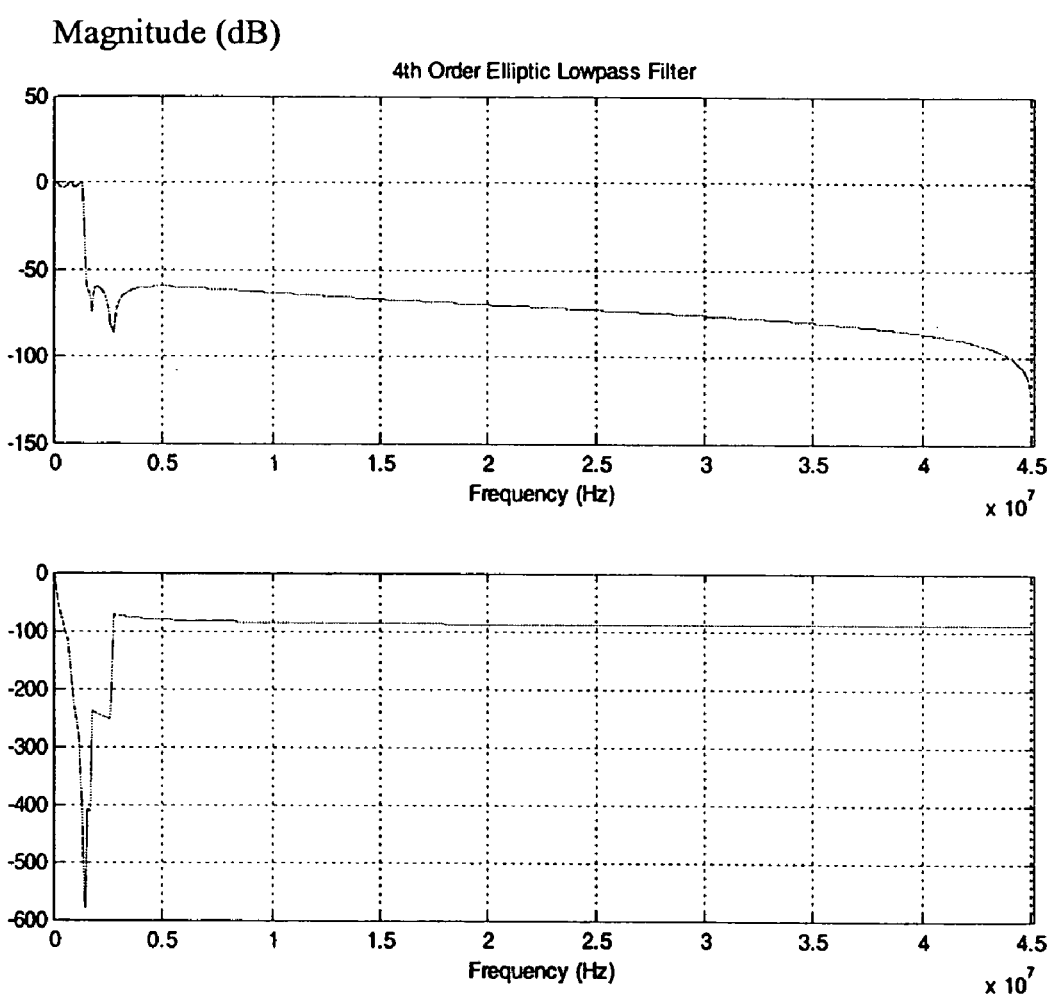
FIG. 11 is a digital Low Pass filter used to separate the direct path signal from the propagation delayed multi-path components in Example 1.
Figure 12:
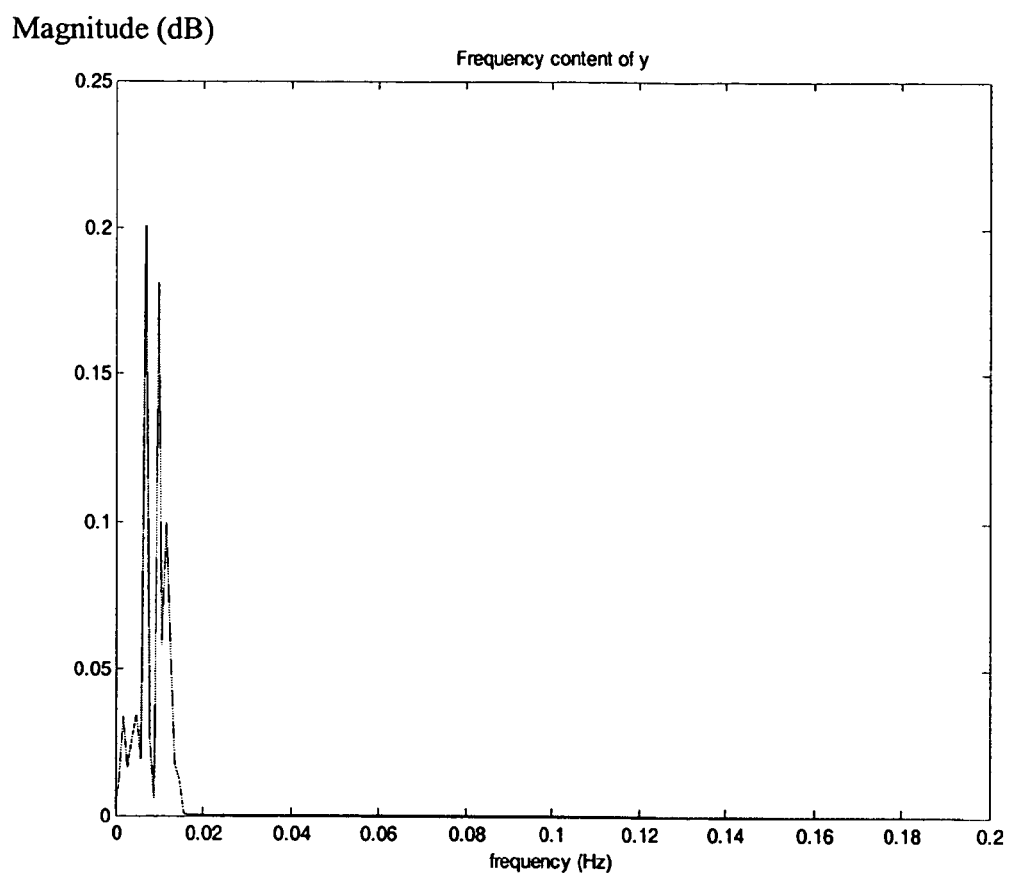
FIG. 12 is a power Spectral Density Frequency versus Time of all of the received signals (direct and all multi-path signals) that arrive at the receiving antenna in Example 1. The Fourier transform was performed after mixing the signal to the base-band frequency and after passing the digital low pass filter over the signal.
Figure 13:
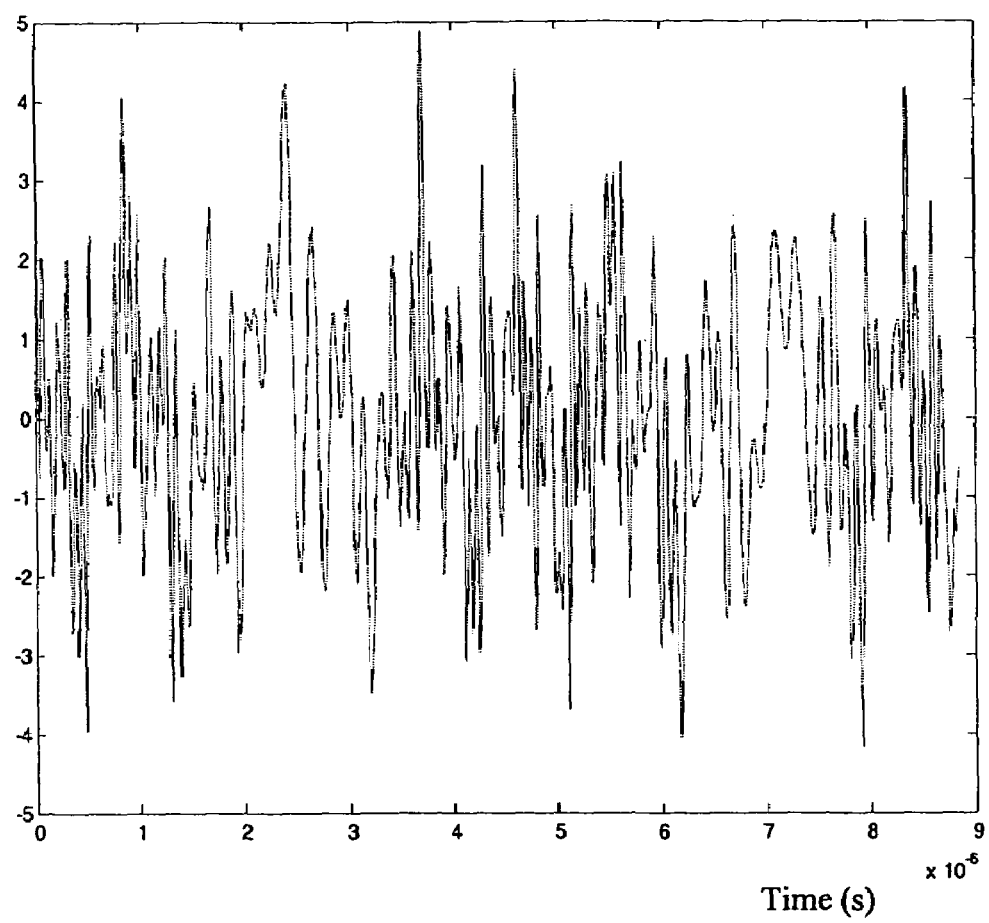
FIG. 13 is a time domain plot of all of the received signals (direct and all multi-path signals) that arrive at the receiving antenna (after mixing the signal to the base-band frequency) in Example 1.
Figure 14:
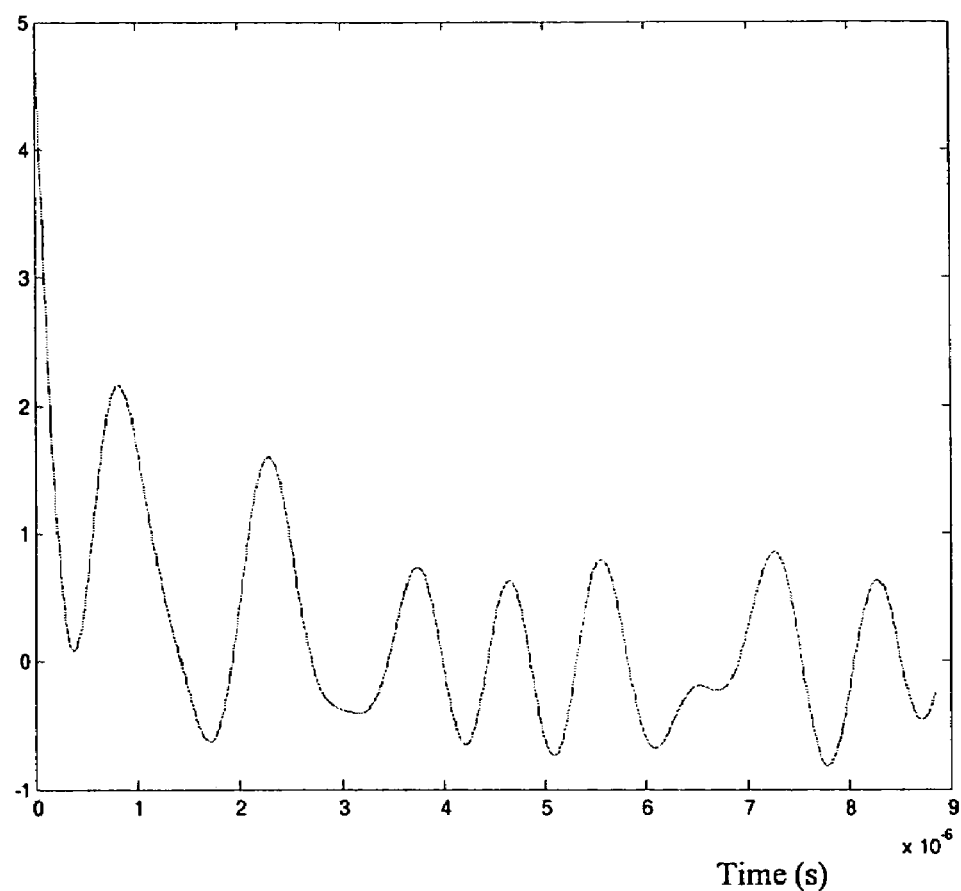
FIG. 14 is a time domain plot of all of the received signals (direct and all multi-path signals) that arrive at the receiving antenna (after mixing the signal to the base-band frequency and after digital low pass filtering) in Example 1.

After reception, the signal is heterodyned down to the base-band frequency by mixing the received signals with the reference signal. Insight can be gained by examining the figures. FIGS. 7-10 detail all of the received components separately; FIG. 7 shows the frequency domain of the direct path signal and FIGS. 8-10 detail each of the received multi-path components. Analysis of the figures demonstrate that the more delayed the signal the greater the spread in the frequency the signal becomes. This phenomenon is due to the increase in the modulation index resulting from the increased frequency difference between the reference and the multipath signal. This increase in the power spreading is advantageous as it's naturally providing additional filtering to the unwanted multi-path components. This analysis also demonstrates that the direct path component can be isolated from the multi-path components through a filtering process if a very sharp cut-off filter is applied to the data. Utilizing the frequencies detailed in FIGS. 7-10, an elliptic 8th order low pass filter was designed (FIG. 11) for this purpose in the apparatus of the first embodiment.

After the mixing process, the signal is digitized and processed with a digital low-pass filter (or band-pass) that is designed to preserve only the frequencies where the direct path signal is located. This removes all of the other undesired components of the signal, such as the multi-path components, that lie outside this narrow frequency window. The remaining signal may then be used to calculate the velocity of the fluid from a calibration equation.

A detailed description of a particularly preferred, second embodiment of the invention is provided in Example 2 below. In this embodiment, the maximum frequency deviation (fd) of the signal transmitted through the test fluid (i.e., the range between the highest and lowest frequencies generated by the VCO) may vary with the desired velocity resolution. The maximum frequency deviation and the frequency repetition rate ($f_r$), which is the rate at which the saw tooth repeats itself, are selected to provide good frequency separation between the low and high velocities or the low and high density, as the final measurement is in the form of a sinusoid whose frequency correlates to the sonic velocity plus or minus the air velocity, depending upon the direction of transmission. The frequency repetition rate should preferably be at least about 1 kHz when utilizing a 1 kHz frequency deviation. Other modifications can be achieved by utilizing a slower voltage control repetition rate ($f_r$). However, at the lower repetition frequency the closest multi-path interferer will have a much smaller frequency separation between the multi-path signal and the desired straight path signal. As such it will be much harder to remove the multi-path signal from the composite signal through the filtering process.

The actual frequency of the signal transmitted through the material may vary and is not critical. In general, for liquid or gas phase fluids suitable pressure wave frequency ranges are between about 20 KHz to about 20 MHz.

One preferred method of generating the signals to be transmitted through the material and to be used as the reference is to utilize a direct digital synthesizer to create the control voltage signal that is frequency locked to a temperature stabilized crystal oscillator reference. The output of the synthesizer is then filtered to remove or smooth the discrete steps created by the digital synthesis process. In an alternative preferred embodiment, also described in Example 2, rather than generating signals with continuously varying frequencies, the system may generate signals with discretely time varying frequencies. For example, discrete time varying signals may be produced using a digital method of generating the sinusoid or saw-tooth and then follow this digital to analog synthesis device with an analog low pass filter to smooth out and remove or almost remove the steps from the wave form. It is also envisioned that the discrete time varying signals may also be produced using a completely digital method of generating the signal at a rate sufficient to ensure the signals will be at different frequencies upon arrival at the mixer. Another alternative method of providing the control voltage signal is to utilize standard methods to produce an analog sawtooth waveform. A variety of digital or analog synthesizers and analog low pass filters are suitable for use herein.

The control voltage is applied to the voltage controlled oscillator (VCO) to generate the pressure wave signal with the described controlled, continuously varying frequency. A variety of digital or analog means to generate this signal would be acceptable. The continuously varying pressure wave signal is then split into two signals (signal 1 and signal 2) utilizing a power splitter, whereupon signal 1 will be transmitted through the fluid in the conduit and signal 2 will be used as the internal reference signal.

Following transmission through the fluid, the transmitted signal is received and then mixed with the reference signal using any conventional mixer such as a Gilbert multiplier, a diode mixer, op-amp multiplier, transistor multiplier or other equivalent multiplier circuit. This mixed signal is then passed through an analog anti-aliasing low pass filter. A variety of analog filters may be used, provided that the stop band of the filter is such that the frequency components that are located above two times the desired sampling frequency are rejected in order to avoid aliasing of these frequency components into the signal during the digitization stage that will be performed in a subsequent step (Porat, B., 1997, A course in digital signal processing, New York, John Wiley and Sons, Inc., the contents of which are incorporated by reference herein). This analog filtered mixed signal is then preferably applied to a second, digital band pass filter to remove substantially all of the multipath interfering signals which may be present. Although a band pass filter will provide the best performance and is therefore preferred, a low pass filter may be utilized. Moreover, it is recognized that rather than using an analog and digital filter, all filtering may be performed all in the analog domain or the digital domain.

For digitally filtered signals, the output digital waveform is then analyzed digitally to determine it's frequency, as the frequency of this signal is the measurement of the propagation delay times the rate of change of the transmitted signal's frequency. Thus, this measurement provides a direct method to quantify the propagation delay of the transmitted signal. In the event that all of the filters are analog, either the analog band-pass signal could be digitized and similarly analyzed or a frequency to voltage converter can be utilized to obtain a voltage signal suitable for process control. One advantage to the use of digital filters is that these filters may be fine tuned to reject the maximum amount of multi-path interference as possible. Another advantage of generating the control signal and filtering in the digital domain is that it allows the system to repeat the entire measurement utilizing a different voltage control frequency, thereby giving the system the ability to reject multi-path signals that are at a distance such that they show up after the ramp signal has started to repeat the waveform thereby making this particular multi-path signal appear within the bandpass window and thereby causing interference with the desired straight-path signal. This is known as roll-over interference. When performing this technique multiple times with each repetition utilizing a different control voltage frequency repetition rate as described below, the answers from each test can be averaged to reduce the effect of these roll-over multi-path signals.

Once the final frequency of the filtered signal has been obtained, this frequency can be utilized to calculate the propagation delay or time it takes for signal 1 to be transmitted through the fluid under test. This propagation delay can be used to determine the fluid velocity as described in detail in Example 2.

As noted above, the effects of roll-over interference may be minimized by repeating the measurement in a series of tests. In each test a different control voltage repetition rate ($f_r$) is utilized. The results of each of these tests may then be averaged to obtain the final measurement.

In addition to the above mentioned signal generator, transmitter, receiver, mixer, filters, and frequency detector, the apparatus may also include an optional microprocessor based computer control unit (CPU) effective for receiving and measuring the frequency (of the filtered-mixed signal) and calculating the fluid velocity therefrom.

Conventional interface hardware are also provided allowing communication between the microprocessor and the frequency detector. The microprocessor includes hardware and software effective for determining the fluid velocity. The microprocessor is preferably constructed with an output for displaying or presenting results, and a communications link or input allowing it to be interrogated and/or reprogrammed by the user.

The process and apparatus of the invention may be used to determine the velocity of a wide variety of fluids. Without being limited thereto, the invention is particularly suited to the measurement of velocity of liquid or gas streams passing through conduits such as pipes or ducts, and particularly metal conduits subjected to multipath interference. Non-limiting examples of such fluids include air, water, or steam, and mixed streams such as liquids or gas streams acting as carrier vehicles for solids or liquids, particularly air handler streams containing seedcotton or lint in a cotton ginning operation.

In an alternative embodiment, the sonic velocity through a gaseous fluid may be calculated rather than the fluid velocity. Moreover, because the speed at which the sound waves travel through a gas is related to molecular weight and temperature, the concentration of the components of a binary gas mixture, including steam, can then be accurately determined using conventional techniques. Without being limited thereto, techniques which are suitable for use herein for calculating the molecular weight and hence the concentration of components in a binary gas mixture from the sonic velocity are described by M. Joos et al. ("An ultrasonic sensor for the analysis of binary gas mixtures", Sensors and Actuators, B., 15-16, 1993, 413-419) and L. Zipser and F. Wachter ("Acoustic sensor for ternary gas analysis", Sensors and Actuators, B., 26-27, 1995, 195-198), the contents of each of which are incorporated by reference herein.

The following examples are intended only to further illustrate the invention and are not intended to limit the scope of the invention which is defined by the claims.

EXAMPLE 1

The apparatus of the above-described first embodiment and shown in FIG. 1 was used to measure the velocity of a fluid. This technique was analyzed with the multi-path interference modeled by a set of three delayed signals that was added at the receiving transducer to the received signal. The delayed multi-path signals consisted of a 3, 5, 7 and 20 m signal delay. This delay is due to the signal propagating out into multiple directions with each of these separate signal vectors following a longer path to the receiving transducer as discussed earlier. As is standard in the industry, the signal strength of the interference can be reduced in signal strength to a fraction of the transmitted signal (Stremler, ibid). Typical values used in this type of modeling suggest levels of less than 10%, however in this case it was felt that a 100% signal strength level would be a better indication of success as the distances involved are very small and there is no real attenuation expected from distance effects. As such all of the attenuation effects will be due solely to the front to back ratio of the transducers as the multi-path signals are created from a fraction of the total transmitter power. A typical transducer will exhibit a front to back radiation ratio of 10-15 dB, which corresponds to a signal strength of a less than 20% of the direct path signal strength (Cheng, ibid) (Balanis, ibid). As such, this model will be conservative and should provide a good indication of the worst case potential of the system in practice.

This invention provides a system that automatically repeats the waveform, thereby increasing the signal strength through repetition. As this feature causes the system to start over at some future delta-t, when it does so it is possible that a long multi-path signal will be just arriving at this time as well. This leads to an ambiguity between the direct path and this long multi-path signal. This exact length can be calculated by the frequency of the multi-path signal as $t=1/f$ which leads directly to the path length of ambiguity of distance=$c/f$. To remove this effect, the signal measurement can be repeated at a different repetition frequency where that specific ambiguity multi-path signal will appear in a different portion of the frequency domain thereby removing its effect from the measurement. In this way, the system can also remove this multi-path signal from the direct path signal. As it is possible that a new multipath signal will now appear at this ambiguity distance, this process can be repeated numerous times to obtain multiple readings by which to extract the true propagation delay through an averaging or filtering process on these replicated readings.

EXAMPLE 2

This example is presented for a fluid of standard temperature-pressure air. A path length of between transducers of 1 meter is assumed.

The following steps are performed two times; once in the forward direction from transducer A to transducer B, and then a second time in the reverse direction from transducer B to transducer A: once the air propagation delay measurement is obtained in the forward direction and again in the reverse direction, the air measured propagation delay is obtained. After obtaining both the air propagation delay in the forward and reverse directions, the measurement is the difference between these two readings. It is this final difference measurement that provides a measure of the air velocity that is independent of the temperature and density of the air (the sonic velocity).

Further improvements can be achieved by repeating the measurement in a series of tests. In each test, a different control voltage repetition rate is utilized and/or with a difference of the control voltage peak to peak level, thereby providing a different frequency span. The results of each of these tests is then averaged to obtain the final measurement.

Step 1: Generate a control voltage in the form of a Saw Tooth or Sinusoidal waveform with whose voltage range is such that the preferred maximum frequency deviation of the voltage controlled oscillator (VCO) is less than 4 kHz in order to achieve an accurate measure of air velocity. The frequency repetition rate, the rate at which the saw tooth repeats itself, should be at least long enough to receive the slowest transmitted signal. For a distance of 1 meter, 300 Hz is a suitable repetition rate and as the distance is decreased the repetition rate should be proportionately increased. The goal of this configuration is to provide good frequency separation between the low and high velocity response, as the final measurement is in the form of a sinusoid whose frequency correlates to the sonic velocity plus the velocity of the air. The preferred method of generating this signal is to utilize a direct digital synthesizer that is frequency locked to a temperature stabilized crystal oscillator reference. One such suitable digital synthesizer is Analog Devices AD9832 although any other digital or analog means to generate this signal would be acceptable.

Step 2: Apply the control voltage of step 1 to the voltage controlled oscillator (VCO). This VCO will have a specification rating such that this VCO will generate a range of frequencies ranging 38 kHz to 42 kHz for the applied control voltage input as previously discussed in step 1, hereafter known as signal 0, when the voltage control signal of step 1 is input to this VCO. One such suitable VCO is the LM565 VCO manufactured by National Semiconductor Corp. although any other digital or analog means to generate this signal would be acceptable.

Step 3: Provide a power divider to split the signal into two signals; signal 1 and signal 2. Signal 1 will be used to transmit the signal through the air and signal 2 will be used as the internal reference signal.

Step 4: Convey signal 1 to an amplifier by means of a coaxial cable.

Step 5: Convey signal 2 to a mixer or Gilbert multiplier or equivalent.

Step 6: Convey amplified signal 1 to an piezo electric transducer or other type of directional pressure transducer with a preferred signal focusing or gain of at least 10 20 dB. This transducer is to be located on one side of the air duct such that the majority of the signal is transmitted through the air toward a second transducer, whereby said transmitting transducer is located substantially upstream or downstream of said receiving transducer.

Step 7: Place a receiving transducer of similar design to the transmitting transducer utilized in step 6, on the opposite side of the air space or air duct under test. This transducer should be oriented such that the best reception of the transmitted signal will be received. It should be noted that this technique as detailed in steps 6 and 7 will work with any type of pressure transducer or speaker/microphone combination pair as long as they are specified to be of a suitable frequency range and that the use of directional type transducers is only specified in order to achieve the best possible performance, but is not absolutely necessary.

Step 8: Convey received signal 1 by means of a coaxial cable to the mixer of step 5.

Step 9: Mix the signal 1 with signal 2 in the mixer of step 5 and step 8 to form signal 3.

Step 10: convey signal 3 by means of coaxial cable to an analog anti aliasing low pass filter to form a filtered version of signal 3 hereafter labeled signal 4. In the preferred embodiment, the filter will be constructed to have the following specifications; the corner frequency is less than 4 kHz, the passband ripple is less than 3 dB, and the stop band attenuation is greater than –40 dB in relation to the passband signal (Valkenburg, 1982, Analog Filter Design, Holt, Rinehart and Winston, New York, the contents of which are incorporated by reference herein). It should be noted that the only true requirement is that the stop band of the filter be such that the frequency components that are located above two times the desired sampling frequency are rejected in order to avoid aliasing of these frequency components into the signal during the digitization stage that will be performed in a subsequent step (Porat, 1997, A course in digital signal processing, New York, John Wiley and Sons, Inc., the contents of which are incorporated by reference herein).

Step 11: Convey signal 4 to an analog to digital converter (a2d). This a2d converter must sample signal 4 at a frequency that is greater than two times the stop band frequency of the analog low pass filter that was utilized in step 10 (Porat, 1997). For this example, the preferred sampling frequency is greater than 100 kHz. This analog to digital captured signal in digital form (data) will hereafter be referred to as signal 5.

Step 12: Apply a digital band pass filter to the data that comprises signal 5. This digital filtered will be designed with the first, upper, corner frequency occurring at the same frequency as where the downstream velocity measurement, at the highest air velocity, produces it's beat frequency. The second, lower, corner frequency will be placed at the frequency of where the upstream beat frequency at the slowest air velocity occurs as it is the lowest frequency of interest. For this example; this digital band pass signal will be constructed with the following preferred specifications, though other specifications could also be used at a likely reduction in performance; the first corner frequency will be 0.02 pi, the second upper corner frequency will be 0.05 pi, the stop band will be attenuated to below −40 dB in relation to the passband, and the preferred roll off of the corner frequencies will be greater than minus 80 dB/decade (Porat, 1997). It should be noted that while a band pass filter will provide the best performance; a low pass filter could also be utilized. It should further be noted that steps 11 and 12 could alternatively be performed all in the analog domain at the cost of loss of flexibility and stability of the filtering operation.

Step 13: The output digital waveform from step 12 is then analyzed digitally to determine it's frequency. The frequency of this signal is the measurement of the delay. Thus, in the all analog variant of step 12, either the analog band pass signal of step 12 could be digitized and similarly analyzed as outlined earlier in this step or a frequency to voltage converter can be utilized to obtain a voltage signal suitable for process control.

Step 14: Once the final frequency of the filtered signal 5 has been obtained, this frequency can be utilized to calculate the propagation delay or time it takes for signal 1 to be transmitted from transducer A to transducer B. The propagation delay provides a direct measure of the pressure wave's velocity which is equal to the sonic velocity plus the air velocity (assuming, for this example, that transducer A is upstream of transducer B)

$$v_{pp} = v_s + v_a \tag{1a}$$

Where
$v_{pp}$:=propagation velocity of the wave through the air in the downstream direction (m/s)
$v_s$:=sonic velocity of air (m/s)
$v_a$:=air velocity to be measured (m/s)

Step 15: Repeat step 14 such that the signal is transmitted from transducer B back to transducer A. Thus, once a final frequency of the filtered signal 5 has been obtained for the reverse direction, this frequency can be utilized to calculate the propagation delay or time it takes for signal 1 to be transmitted from transducer B to transducer A. This propagation delay is typically quantified by the air velocity minus the sonic velocity.

$$v_{pm} = v_s - v_a \tag{1b}$$

Where
$v_{pm}$:=propagation velocity of the wave through the air in the upstream direction (m/s)

Hence, once the values for equations 1a and 1b have been determined, these parameters can be used to determine the air velocity or the sonic velocity as shown in equations 2, 3:

$$v_a = (v_{pp} - v_{pm})/2 \tag{2}$$

$$v_s = (v_{pp} + v_{pm})/2 \tag{3}$$

Where
$V_a$:=air velocity (m/s)
$V_s$:=sonic velocity (m/s)

Utilizing equations 1-3 as the final equations, the intermediate equations relating this swept frequency technique to equations 1-3 are detailed in equations 4-6

$$t = L/v_{pn} \tag{4a}$$

$$df/dt = f_d * f_r \tag{4b}$$

Where
$v_{pn}$:=propagation velocity in the n direction (m/s)
t:=transmit time for the wave (signal 1) to propagate through the fluid (s)
L:=signal propagation path length {distance between transducers} (m)
df/dt:=frequency rate of change of the transmitted signal 1 (hz/s)
$f_d$:=maximum frequency deviation of signal 1 (4 kHz as discussed in step 1)
$f_r$:=repetition frequency of the output signal 1 (300 Hz as discussed in step 1)
$d_f$:=difference frequency between the internal reference signal and the received transmitted signal 1 (Hz) and $$d_{f\_for} = t_{for} df/dt \tag{5}$$

$$d_{f\_rev} = t_{rev} df/dt \tag{6}$$

where
$d_{f\_air}$:=difference frequency in the forward or downstream direction
$d_{f\_rev}$:=difference frequency in the reverse or upstream direction It is a goal of this invention to provide a measurement of fluid velocity that is independent of geometry, temperature and pressure; therefore the path length of the propagation needs to be accounted for. Utilizing these basic relations from equations 1-6, we arrive at the function that predicts the air velocity from the measured difference frequencies (equation 7) and the sonic velocity (equation 8) and finally the molecular weight for the fluid from equations 9 and 10, assuming the fluid temperature is known (which also provides the ratio of specific heats for the particular fluid/s).

$$v_{air} = L(f_d * f_r)[1/d_{f\_for} - 1/d_{f\_rev}]/2 \tag{7}$$

$$v_{sonic} = L(f_d * f_r)[1/d_{f\_for} + 1/d_{f\_rev}]/2 \tag{8}$$

$$v_{sonic} = sqrt(g*P/den) = sqrt(g*R*T/Mw) \tag{9}$$

$$Mw = (v_{sonic})^2/(g*R*T) \tag{10}$$

where
g=gamma=ratio of specific heats
P=pressure
den=density
R=ideal gas constant
T=absolute temperature (kelvin)
Mw=molecular weight of the gas

MODIFICATIONS

The advantage to performing in the digital domain is that it allows the system to fine tune the bandpass filter to reject the maximum amount of multi path interference as possible. The other key advantage of generating the control signal and filtering in the digital domain is that it allows the system to repeat the entire measurement utilizing a different voltage control frequency thereby giving the system the ability to reject multi path signals that are at a distance such that they show up after the ramp signal has started to repeat the waveform thereby making this particular multi path signal appear within the bandpass window and thereby causing interference with the desired straight path signal. This is known as roll over interference. When performing this technique multiple times with each time utilizing a different control voltage frequency repetition rate, the answers from each test can be averaged to reduce the effect of these roll over multi path signals.

Other modifications can be achieved by utilizing a slower voltage control repetition rate (repetition frequency). The design trade off here is that at the lower repetition frequency the closest multi path interferer will have a much smaller frequency separation between the multi path signal and the desired straight path signal. As such it will be much harder to remove the multi path signal from the composite signal through the filtering process.

It is understood that the foregoing detailed description is given merely by way of illustration and that modifications and variations may be made therein without departing from the spirit and scope of the invention.

I claim:

1. A process for determining the velocity or density of a fluid comprising:
    producing a primary electrical signal with a varying frequency, said signal being a continuously varying signal or a discrete time varying signal,
    splitting said primary signal to provide first and second electrical signals, whereby first electrical signal is then used to create a first pressure wave signal, said first pressure wave signal to be transmitted through said fluid and said second signal comprising an internal reference signal,
    transmitting said first pressure wave signal through said fluid,
    receiving at a receiver a third signal which comprises potential multi-path interference signals and said first pressure wave signal which has passed through said fluid,
    mixing said third signal together with said second signal, generating a mixed signal,
    filtering said mixed signal to remove substantially all of said multi-path interference signals, generating a filtered-mixed signal
    measuring the frequency of said filtered-mixed signal to determine the propagation delay of said first pressure signal after it has passed through said fluid, and
    calculating the velocity or density of said fluid from said propagation delay of said first pressure wave signal after it has passed through said fluid,
    wherein the frequency of said primary electrical signal varies sufficiently rapidly that the frequency of said third signal and said second signal will be different when they are received at said receiver.

2. The process of claim 1 wherein said frequency of said first signal varies at a first controlled repetition rate having a maximum frequency deviation.

3. The process of claim 2 further comprising repeating all of said producing, splitting, transmitting, receiving, mixing, filtering, measuring, and calculating steps wherein said frequency of said first signal varies at a second controlled repetition rate which is different from said first controlled repetition rate, and determining a mean velocity from the velocity calculated at each of said first and second controlled repetition rates.

4. The process of claim 3 further comprising repeating all of said producing, splitting, transmitting, receiving, mixing, filtering, measuring, and calculating steps wherein said frequency of said first signal varies at a plurality of controlled repetition rates which are different from said first controlled repetition rate, and determining a mean velocity from the velocity calculated at each of said other controlled repetition rates.

5. The process of claim 2 wherein said first controlled repetition rate is greater than or equal to about 100 Hz.

6. The process of claim 2 further comprising repeating all of said producing, splitting, transmitting, receiving, mixing, filtering, measuring, and calculating steps at a different said maximum frequency deviation, and determining a mean velocity from the velocity calculated at each of said different maximum frequency deviations.

7. The process of claim 1 wherein said velocity of said fluid is calculated, and said transmitting comprises transmitting said first pressure wave signal through said fluid in a first direction which is diagonal to or parallel to the direction of flow of said fluid.

8. The process of claim 7 further comprising:
    transmitting another first pressure wave signal through said fluid in a second direction which is opposite to said first direction,
    receiving at a receiver another third signal which comprises potential multi-path interference signals and said another first signal which has passed through said fluid,
    mixing said another third signal together with said second signal, generating another mixed signal,
    filtering said another mixed signal to remove substantially all of said multi-path interference signals, generating another filtered-mixed signal
    measuring the frequency of said another filtered-mixed signal to determine the propagation delay of said another said first signal after it has passed through said fluid, and
    calculating the velocity of said fluid from both of said propagation delay of said first pressure wave signal after it has passed through said fluid in said first direction and said propagation delay of said another said first pressure wave signal after it has passed through said fluid in said second direction,
    wherein the frequency of said primary signal varies sufficiently rapidly that the frequency of said third signal and said another third signal will be different from said second signal when they are received at said receiver.

9. The process of claim 1 wherein said density of said fluid is calculated, and said transmitting comprises transmitting said first pressure wave signal through said fluid in a first direction which is diagonal to or normal to the direction of flow of said fluid.

10. The process of claim 9 further comprising:
    transmitting another first pressure wave signal through said fluid in a second direction which is opposite to said first direction,
    receiving at a receiver another third signal which comprises potential multi-path interference signals and said another first signal which has passed through said fluid,
    mixing said another third signal together with said second signal, generating another mixed signal,
    filtering said another mixed signal to remove substantially all of said multi-path interference signals, generating another filtered-mixed signal
    measuring the frequency of said another filtered-mixed signal to determine the propagation delay of said another said first signal after it has passed through said fluid, and calculating the velocity of said fluid from both of said propagation delay of said first pressure wave signal after it has passed through said fluid in said first direction and said propagation delay of said another first pressure wave signal after it has passed through said fluid in said second direction, wherein the frequency of said primary signal varies sufficiently rapidly that the frequency of said third signal and said another third signal will be different from said second signal when they are received at said receiver.

11. The process of claim 1 wherein said primary signal comprises a continuously varying signal.

12. The process of claim 11 wherein said primary signal whose frequency is continuously varying is produced by a voltage controlled oscillator with a continuously varying voltage source.

13. The process of claim 1 wherein said fluid is selected from the group consisting gases, liquids, and mixed phase fluids.

14. The process of claim 1 wherein the frequency of said first pressure wave signal is between about 20 KHz and about 20 MHz.

15. The process of claim 1 wherein said primary signal comprises a discrete time varying signal.

16. The process of claim 1 wherein said filtering of said mixed signal to remove substantially all of said multi-path interference signals comprises:
  sampling said mixed signal with an analog to digital converter to form a discrete sampled mixed signal
  filtering said discrete sampled mixed signal with a digital filter to remove substantially all of said multi-path interference signals, thereby generating said filtered-mixed signal.

17. An apparatus for automatically determining the velocity of a fluid flowing through a conduit comprising:
  a pressure wave signal generator effective for producing a pressure wave signal with either a continuously varying frequency or a discrete time varying frequency,
  a pressure wave signal transmitter effective to transmit said pressure wave signal through a fluid in a conduit,
  a pressure wave signal receiver effective to receive said pressure wave signal after it has passed through said fluid in said conduit,
  a pressure wave signal mixer effective for mixing said pressure wave signal received by said receiver and a reference signal to generate a mixed signal,
  a pressure wave signal filter effective to remove substantially all multipath interference signals to generate a filtered-mixed signal, and
  a frequency detector effective to determine the frequency of said filtered-mixed signal,
wherein the frequency of said pressure wave signal produced by said pressure wave signal generator varies sufficiently rapidly that the frequency of said pressure wave signal received at said pressure wave signal receiver after it has passed through said fluid in said conduit and said reference signal will be different.

18. The apparatus of claim 17 further comprising a microprocessor coupled to said frequency detector and effective for calculating the velocity of said fluid from the frequency of said filtered-mixed signal.

* * * * *